United States Patent
Song et al.

(10) Patent No.: US 10,203,725 B2
(45) Date of Patent: Feb. 12, 2019

(54) DOUBLE DISPLAY DEVICE AND WEARABLE APPARATUS

(71) Applicant: BOE TECHNOLOGY GROUP CO., LTD., Beijing (CN)

(72) Inventors: Song Song, Beijing (CN); Kazuyoshi Nagayama, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 121 days.

(21) Appl. No.: 15/104,939

(22) PCT Filed: Sep. 28, 2015

(86) PCT No.: PCT/CN2015/090916
§ 371 (c)(1),
(2) Date: Jun. 15, 2016

(87) PCT Pub. No.: WO2016/197488
PCT Pub. Date: Dec. 15, 2016

(65) Prior Publication Data
US 2017/0123459 A1    May 4, 2017

(30) Foreign Application Priority Data
Jun. 8, 2015   (CN) .......................... 2015 1 0309639

(51) Int. Cl.
G06F 1/16    (2006.01)
G06F 3/14    (2006.01)
G09G 3/20    (2006.01)

(52) U.S. Cl.
CPC ............ *G06F 1/1647* (2013.01); *G06F 1/163* (2013.01); *G06F 1/1624* (2013.01);
(Continued)

(58) Field of Classification Search
CPC ...... G06F 1/1647; G06F 1/163; G06F 1/1624; G06F 1/1652; G09G 3/2092; G09G 2380/02
See application file for complete search history.

(56) References Cited

U.S. PATENT DOCUMENTS

| | | | |
|---|---|---|---|
| 2003/0006942 A1* | 1/2003 | Searls | G06F 1/1616 345/1.1 |
| 2004/0140947 A1* | 7/2004 | Tsuyuki | G09G 3/3666 345/1.1 |

(Continued)

FOREIGN PATENT DOCUMENTS

| | | |
|---|---|---|
| CN | 1606317 A | 4/2005 |
| CN | 101013208 A | 8/2007 |

(Continued)

OTHER PUBLICATIONS

Second Chinese Office Action, for Chinese Patent Application No. 201510309639.2, dated Mar. 27, 2017, 12 pages.

(Continued)

*Primary Examiner* — Alexander Eisen
*Assistant Examiner* — Kebede T Teshome
(74) *Attorney, Agent, or Firm* — Kinney & Lange, P.A.

(57) ABSTRACT

The present disclosure provides a double display device and a wearable apparatus including the double display device, the double display device including: a first display module and a second display module arranged in parallel and connected slidably with each other, the first display module including a first display panel, the second display module including a second display panel; and a common driving component configured to provide a first driving signal to the first display panel and provide a second driving signal to the second display panel.

20 Claims, 5 Drawing Sheets

(52) U.S. Cl.
CPC .......... *G06F 1/1652* (2013.01); *G06F 3/1431* (2013.01); *G09G 3/2092* (2013.01); *G09G 2300/0426* (2013.01); *G09G 2380/02* (2013.01)

(56) References Cited

U.S. PATENT DOCUMENTS

| | | | | |
|---|---|---|---|---|
| 2005/0253775 | A1* | 11/2005 | Stewart | G06F 1/1616 345/1.1 |
| 2006/0073859 | A1* | 4/2006 | Chou | H04M 1/0235 455/575.4 |
| 2007/0188406 | A1* | 8/2007 | Ma | G06F 3/1423 345/1.1 |
| 2014/0313650 | A1* | 10/2014 | Nakamura | G06F 1/1624 361/679.01 |
| 2015/0186092 | A1* | 7/2015 | Francis | G06F 3/1423 345/520 |
| 2016/0093024 | A1* | 3/2016 | Kang | G06T 3/60 345/656 |
| 2016/0143131 | A1* | 5/2016 | Ahn | H05K 1/028 361/749 |

FOREIGN PATENT DOCUMENTS

| | | |
|---|---|---|
| CN | 102124719 A | 7/2011 |
| CN | 103680319 A | 3/2014 |
| CN | 204178148 A | 2/2015 |
| CN | 104835446 A | 8/2015 |
| EP | 2296354 A1 | 3/2011 |
| JP | 2010237619 A | 10/2010 |

OTHER PUBLICATIONS

Partial European Search Report, for European Patent Application No. 15866385.6, dated Aug. 23, 2017, 15 pages.
International Search Report and Written Opinion (including English translation) dated Feb. 18, 2016 for corresponding PCT Application No. PCT/CN2015/090916.
First Chinese Office Action dated Jul. 4, 2016, for corresponding Chinese Application No. 201510309639.2.
Extended European Search Report, for European Patent Application No. 15866385.6, dated Dec. 1, 2017, 13 pages.

* cited by examiner

DOUBLE DISPLAY DEVICE AND WEARABLE APPARATUS

CROSS-REFERENCE TO RELATED APPLICATION

This application is the national phase of PCT Application No. PCT/CN2015/090916 filed Sep. 28, 2015, which in turn claims the benefit of Chinese Patent Application No. 201510309639.2, entitled as "DOUBLE DISPLAY DEVICE AND WEARABLE APPARATUS", filed on Jun. 8, 2015, both of which are incorporated herein by reference in their entirety.

BACKGROUND OF THE INVENTION

Field of the Invention

Embodiments of the present disclosure relate to a double display device and a wearable apparatus.

Description of the Related Art

As display device technique develops continuously, a single display device has not met various requirements in applications. A double display device with two display modules not only can extend a display space, but also can be used in various smart products, and thus it becomes more and more popular.

SUMMARY

The embodiments of the present disclosure provides a double display device and a wearable apparatus including the double display device, the double display device including: a first display module and a second display module arranged in parallel and slidably connected with each other, the first display module including a first display panel, the second display module including a second display panel; and a common driving component configured to provide a first driving signal for the first display panel and provide a second driving signal for the second display panel.

BRIEF DESCRIPTION OF THE DRAWINGS

In order to explain technical solutions of the embodiments of the present disclosure more explicitly, the drawings that are intended to explain the embodiments or the related art will below be described briefly. Apparently, the drawings described below are only related to some of the embodiments of the present disclosure, but are not intended to limit the present disclosure.

DETAILED DESCRIPTION OF PREFERRED EMBODIMENTS OF THE INVENTION

The embodiments of the present disclosure will be further explained clearly and entirely below with reference to the figures and examples, so as to explain the exemplified embodiments of the present disclosure and their various features and advantageous details more comprehensively. Please be noted that features shown in figures are not scaled by practical proportions. In order to avoid obscurity of the exemplified embodiments of the present disclosure, known materials, assemblies and process technology will be omitted. The examples are only intended to explain the implementation of the exemplified embodiments of the present disclosure and further enable the skilled person in the art to implement the exemplified embodiments. Therefore, these examples should not be understood to limit the scope of the exemplified embodiments of the present disclosure.

The technical terms or scientific terms used herein should be explained as general senses understood by the skilled person in the art, unless defined otherwise. The terms of "first", "second" and similar terms used in the present disclosure are not intended to represent any orders, numbers or significance, but are intended to distinguish different integral parts from each other. The terms of "up", "down", "left", "right", etc. are only intended to represent relative positional relationship. When absolute positions of the described objects are changed, their relative positional relationship may also be changed correspondingly.

The conventional double display device having a first display panel and a second display panel arranged in parallel to each other generally includes a separate first driving part and a separate second driving part, being configured to apply image data signals for displaying respective images onto the first display panel and the second display panel respectively. The first driving part typically includes a first gate driving unit and a first source driving unit. The second driving part typically includes a second gate driving unit and a second source driving unit. The first gate driving unit, the first source driving unit, the second gate driving unit and the second source driving unit may be arranged separately. In this way, the number of integrated circuits (drive IC) and possible printed circuit boards to be needed for driving becomes increased, which causes the cost of the double display device to increase.

An embodiment of the present disclosure provides a double display device, a manufacturing cost of which is reduced efficiently.

Figure 1:
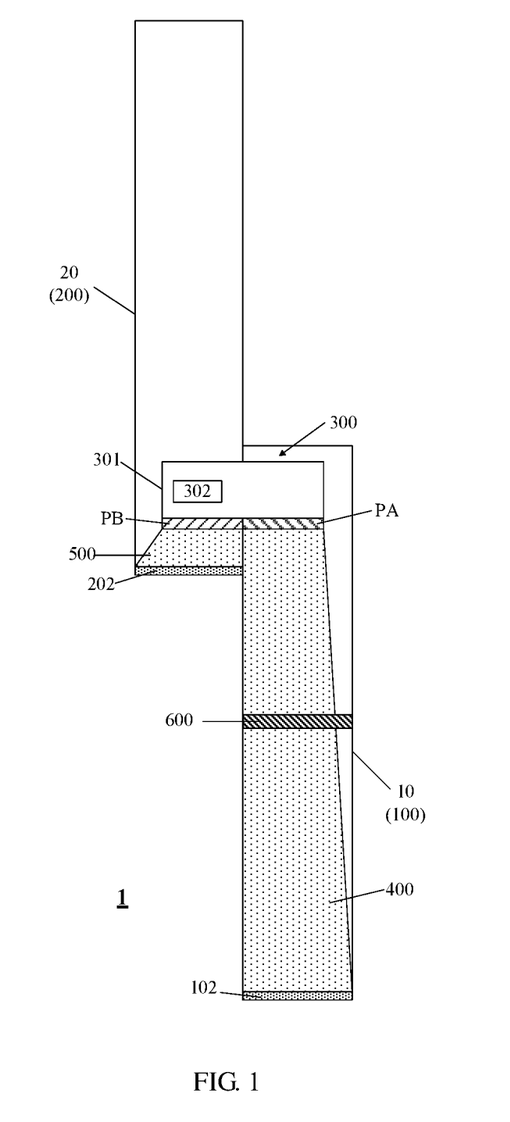
FIG. 1 is a schematic top view showing a structure of a first display module and a second display module of the double display according to an embodiment of the present disclosure, in which the first and second display modules are displaced with each other by a maximum distance.

FIG. 1 is a schematic top view showing a structure of a double display device according to an embodiment of the present disclosure.

With reference to FIG. 1, the double display device 1 includes a first display module 10 and a second display module 20 arranged in parallel and connected slidably with each other. FIG. 1 shows that the first display module 10 and the second display module 20 of the double display device 1 are in a state that they are displaced with each other by a maximum distance.

The first display module 10 includes a first display panel 100. The second display module 20 includes a second display panel 200. It should be understood that the first display module 10 further includes members such as a first backlight unit (in a case that the first display module is a liquid crystal module) and a first module cover, besides the first display panel 100. The second display module 20 further includes members such as a second backlight unit (if required) and a second module cover, besides the second display panel 200.

In FIG. 1, the first display module 10 is shown schematically only by a profile of the first display panel 100 and the second display module 20 is shown schematically only by a profile of the second display panel 200. The first display panel 100 includes a first display region 101. The second display panel 200 includes a second display region 201. The first display region 101 and the second display region 201 constitute display regions of the double display device (these display regions are not shown in FIG. 1, please refer to FIG. 5).

FIG. 1 is a schematic structural top view of the double display device 1 taken from a side opposite to the display regions to the display region side. In a work state, the first display panel may be driven by an active matrix to display a first image in the first display region, and the second display panel may be driven by an active matrix to display a second image in the second display region.

The double display device 1 further includes a common driving component 300. The common driving component 300 is configured to provide a first driving signal to the first display panel 100 and provide a second driving signal to the second display panel 200. The common driving component 300 is arranged to move along with the second display module 20 with respect to the first display panel 100. In the embodiment shown in FIG. 1, the common driving component 300 may for example be attached to a module cover (not shown) of the second display module 20 such that its position is fixed with respect to the second display panel 20 and is able to slide along with the second display module 20 (or the second display panel 200) with respect to the first display panel 100.

In another embodiment, the common driving component 300 for example may be attached to a back plate of the display panel 200, such that it can slide along with the second display module 20 (or second display panel 200) with respect to the first display panel 100. The embodiments of the present disclosure are not limited to a combination of the common driving component 300 and the second display module 20, as long as the common driving component 300 is arranged such that it can slide along with the second display module 20 with respect to the first display panel 100.

In the embodiment shown in FIG. 1, one part of the common driving component 300 is located in the first display module 10 and coincides with the first display panel 100 while the other part of the common driving component 300 extends above the second display module 20 and coincides with the second display panel 200. The common driving component 300 is for example fixed on the module cover of the second display module 20.

In the embodiment shown in FIG. 1, the double display device 1 further includes a first flexible printed circuit board 400 and a second flexible printed circuit board 500. The first flexible printed circuit board 400 has one end connected to the common driving component 300 and the other end connected to the first display panel 100. In this way, the first driving signal provided by the common driving component 300 may be transmitted to the first display panel 100 by the first flexible printed circuit board 400. The second flexible printed circuit board 500 has one end connected to the common driving component 300 and the other end connected to the second display panel 200. In this way, the second driving signal provided by the common driving component 300 may be transmitted to the second display panel 200 by the second flexible printed circuit board 500. Here, the first driving signal is for example transmitted to gate lines and/or data lines of the first display panel for driving the first display panel 100 to display a first image, and the second driving signal is for example transmitted to gate lines and/or data lines of the second display panel for driving the second display panel 200 to display a second image.

If the common driving component 300 is electrically connected to the gate lines and/or data lines of the second display panel by wires formed on the second display panel, the second flexible printed circuit board 500 may be omitted.

In an example, the common driving component 300 includes a printed circuit board 301. The printed circuit board 301 is for example a hard printed circuit board. For example, when the common driving component 300 is overlaid on both the first display panel and the second display panel, the printed circuit board 301 has a first circuit board joining region PA coinciding with the first display module 10 and a second circuit board joining region PB coinciding with the second display module 20. The first display panel 100 has a first panel joining region 102, and the second display panel 200 has a second panel joining region 202. For example, the first circuit board joining region PA and the second circuit board joining region PB are coated with anisotropic conductive adhesive thereon. Also, the first panel joining region 102 and the second panel joining region 202 are for example coated with anisotropic conductive adhesive thereon. One end of the first flexible printed circuit board 400 is pressed and connected to the first panel joining region 102 by a conductive adhesive, while the other end of the first flexible printed circuit board 400 is pressed and connected to the first circuit board joining region PA by a conductive adhesive. One end of the second flexible printed circuit board 500 is pressed and connected to the second panel joining region 202 by a conductive adhesive, while the other end of the second flexible printed circuit board 500 is pressed and connected to the second circuit board joining region PB by a conductive adhesive. In this way, the first flexible printed circuit board 400 is electrically connected to the printed circuit board 301 by the first circuit board joining region PA and electrically connected to the first display panel 100 by the first panel joining region 102 respectively. The second flexible printed circuit board 500 is electrically connected to the printed circuit board 301 by the second circuit board joining region PB and electrically connected to the second display panel 200 by the second panel joining region 202 respectively.

Although FIG. 1 shows the first circuit board joining region PA and the second circuit board joining region PB are arranged on a same side of the printed circuit board 301, in another example, the first circuit board joining region PA and the second circuit board joining region PB may be arranged on opposed sides of the printed circuit board 301. That is, positions at which the first circuit board joining region PA and the second circuit board joining region PB are arranged on the printed circuit board are not limited in the embodiments of the present disclosure, as long as the first circuit board joining region PA and the second circuit board joining region PB are ensured to be separated from each other.

In the embodiment shown in FIG. 1, the common driving component 300 further includes a first driving chip 302 mounted on the printed circuit board 301, the first driving chip 302 outputting the first driving signal and the second driving signal. Here, the first driving signal is for example transmitted to the gate lines and/or data lines of the first display panel for driving the first display panel 100 to display the first image, and the second driving signal is for example transmitted to the gate lines and/or data lines of the second display panel for driving the second display panel 200 to display the second image.

In another example, the common driving component 300 further includes a first driving chip 302 and a second driving chip (not shown) mounted on the printed circuit board 301, the first driving chip 302 outputting the first driving signal and the second driving chip outputting the second driving signal. Here, the first driving signal is for example transmitted to the gate lines and/or data lines of the first display panel for driving the first display panel 100 to display the first image, and the second driving signal is for example transmitted to the gate lines and/or data lines of the second display panel for driving the second display panel 200 to display the second image.

In this way, in comparison with the conventional technical solutions in which two completely separate driving components are needed to provide the first driving signal and the second driving signal to the first display panel and the second display panel respectively, the embodiments of the present application provide a double display device including the common driving component. As provision of the common driving component may at least save one driving component, the manufacturing cost may be reduced efficiently.

Although the printed circuit board mounted with the driving chip is electrically connected to the first and second display panels by the first and second flexible printed circuit boards in the above embodiment, the present disclosure is not limited to this. In another embodiment, the common driving component 300 is for example joined directly to a corresponding terminal of the second display panel 200 by an anisotropic conductive adhesive without needing the second flexible printed circuit board to electrically connect the common driving component 300 and the second display panel 200. In another embodiment (not shown), as an equivalent alternative to the printed circuit board mounted with driving chips and the first and second flexible printed circuit boards in the above embodiments, a flexible printed circuit board mounted with driving chips may for example be used, so as to transmit the first and second driving signals generated by the driving chips to the first and second display panels.

Figure 2A:
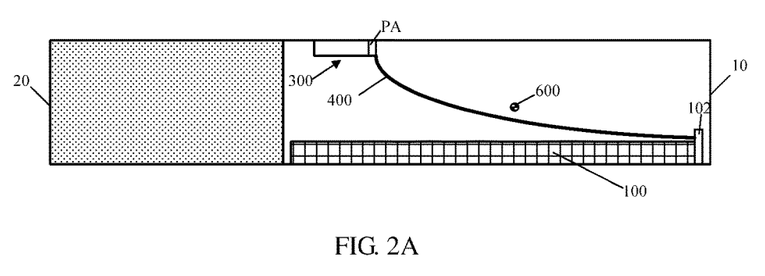
FIGS. 2A-2C are schematic side views showing a process in which the first display module and the second display module slide from a state that they are displaced with each other by the maximum distance to a state that they are displaced with each other by a minimum distance.
Figure 2B:
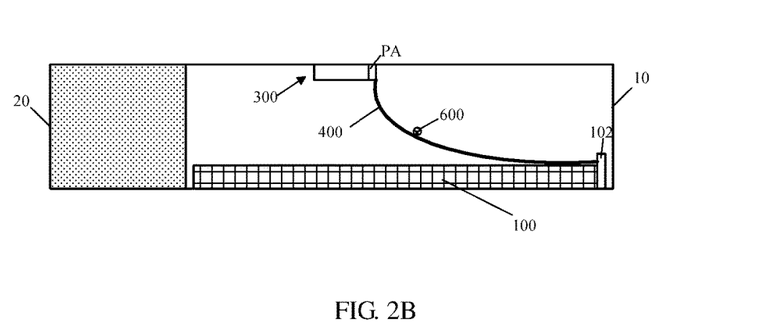
Figure 2C:
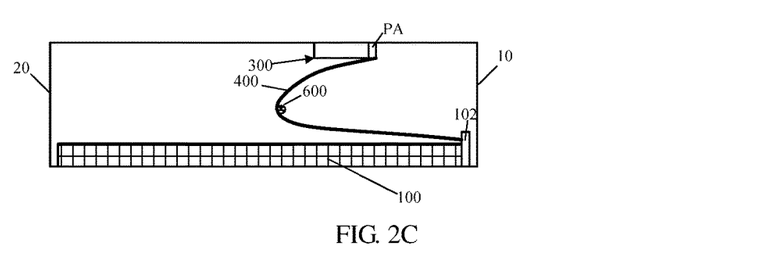
Figures 3A, 3B, 3C:
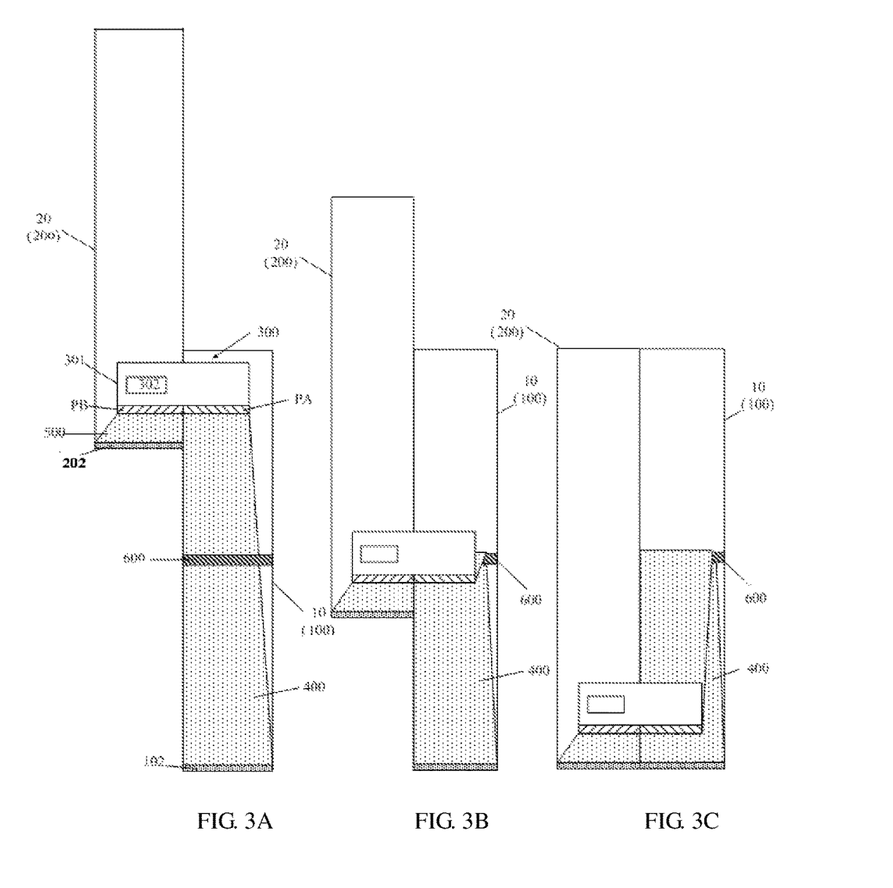
FIGS. 3A-3C are schematic top views showing the process in which the first display module and the second display module slide longitudinally from the state that they are displaced with each other by the maximum distance to the state that they are displaced with each other by a minimum distance.

Further, in the embodiment shown in FIG. 1, a guiding member 600 is arranged in the first display module 10. FIGS. 2A-2C are schematic side views showing the positional relationship between the first flexible circuit board and the guiding member during a process in which the first display module and the second display module slide from a state that they are displaced with each other by a maximum distance to a state that they are displaced with each other by a minimum distance. FIGS. 3A-3C are schematic top views showing the positional relationship between the first flexible circuit board and the guiding member during a process in which the first display module and the second display module slide from a state that they are displaced with each other by the maximum distance to a state that they are displaced with each other by the minimum distance. In FIGS. 2A-2C, the first display module 10 and the second display module 20 are shown as a profile of their module covers. In FIGS. 2A-2C, a display surface of the double display device is its lower surface.

With reference to FIG. 2A and FIG. 3A, in a state that the first display module 10 and the second display module 20 are displaced with each other by the maximum distance, the guiding member 600 and the first flexible printed circuit board 400 may not contact with each other. The first flexible printed circuit board 400 has an upper end connected to the first circuit board joining region PA of the printed circuit board and a lower end connected to the first panel joining region 102 of the first display panel 100. In the embodiment, the guiding member 600 is for example provided on a side of the first flexible printed circuit board 400, for example above the side of the first flexible printed circuit board 400. The guiding member 600 is for example a rod-like member and fixed on the module cover of the first display module such that the relative position of the guiding member 600 and the first display panel 100 is fixed. In the state shown in FIG. 2A and FIG. 3A, the first flexible printed circuit board 400 is for example in an unbendable extension state in entirety.

With reference to FIG. 2B and FIG. 3B, the second display module 20 slides to an intermediate state with respect to the first display module 10. At that time, the guiding member 600 and the first flexible printed circuit board 400 contact with each other. As the common driving component 300 in the embodiment is fixed on the module cover of the second display module and the guiding member 600 is fixed on the module cover of the first display module, the common driving component 300 slides along with the second display module 20 with respect to the first display module 10 when two display modules of the double display device slide relatively from the state shown in FIG. 2A (FIG. 3A) to the state shown in FIG. 2B (FIG. 3B), so as to drive the upper end of the first flexible printed circuit board to move relative to the guiding member 600 such that the guiding member 600 and the first flexible printed circuit board 400 contact with each other in the intermediate state.

With reference to FIG. 2C and FIG. 3C, the second display module 20 continues to slide relative to the first display module 10 to the state that the second display module 20 and the first display module 10 are displaced with each other by a minimum distance. At that time, the first flexible printed circuit board 400 bends around at least one part of the guiding member 600. For example, the second display module 20 continues to slide relative to the first display module 10 to the state that the second display module 20 and the first display module 10 are displaced with each other by the minimum distance. At that time, the first flexible printed circuit board 400 bends around at least one part of the guiding member 600. For example, when the second display module 20 continues to slide relative to the first display module 10 to the state that the second display module 20 and the first display module 10 are displaced with each other by the minimum distance, the second display module 20 and the first display module 10 are aligned with each other. It should be understood that when two display modules of the double display device slides relatively from the state shown in FIG. 2B (FIG. 3B) to the state shown in FIG. 2C (FIG. 3C), the first flexible printed circuit board 400 bends around the guiding member 600 from the state of contacting the guiding member 600, such that the first flexible printed circuit board 400 bends to cover a part of the guiding member 600 in the state shown in FIG. 2C (FIG. 3C).

In the above intermediate state, the second display module 20 and the first display module 10 are displaced with each other by an intermediate distance. The intermediate distance is less than the above maximum distance, but greater than the above minimum distance.

As discussed above, when the two display modules of the double display device slide relatively from the state shown in FIG. 2A (FIG. 3A) to the state shown in FIG. 2C (FIG. 3C), due to effects of guiding and bending the first flexible printed circuit board 400 by the guiding member 600, the first flexible printed circuit board 400 is received and folded into an inner space of the first display module 20 in the state that the first flexible printed circuit board 400 continues to slide relative to the first display module 10 to be displaced with each other by the minimum distance, thus the lifetime of the first flexible printed circuit board 400 may be prolonged efficiently.

Figure 4:
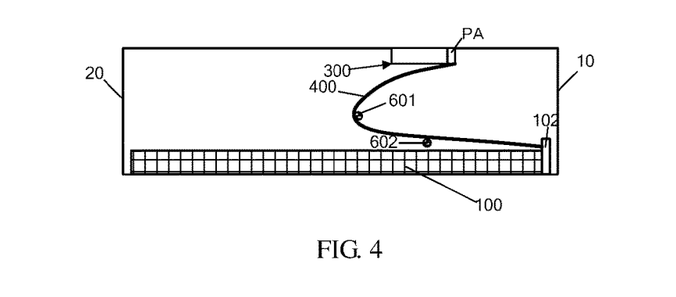
FIG. 4 shows a guiding member according to another embodiment of the present disclosure.

Although the guiding member in the above embodiment is shown to be located on one side of the first flexible printed circuit board, the embodiments of the present disclosure are not limited to this. It should be understood that, in another embodiment, the guiding member 600 may have a first portion 601 located on one side of the first flexible printed circuit board and a second portion 602 located on the other side of the first flexible printed circuit board, for example shown in FIG. 4.

Although the guiding member in the above embodiment is fixed on the module cover of the first display module and the position of the guiding member is fixed with respect to the first display panel, the embodiments of the present disclosure are not limited to this. It should be understood that, in another embodiment, the guiding member may be fixed on other members (for example backlight module) of the first display module, or the guiding member may also be an elastic member itself. That is, in the present disclosure, it is not intended to limit the guiding member is located in a fixed position in the first display module and it is not intended to limit the specific forms of the guiding member itself. The above advantageous technical effects may be achieved as long as the guiding member causes the first flexible printed circuit board to bend around at least one part of the guiding member in case that the two display modules are displaced with each other by the minimum distance.

Further, although in the above embodiments, the guiding member 600 and the first flexible printed circuit board 400 do not contact with each other in case that the first display module 10 and the second display module 20 are displaced with each other by the maximum distance, the embodiments of the present disclosure are not limited to this. In another embodiment, when the first display module 10 and the second display module 20 are displaced with each other by the maximum distance, the guiding member 600 and the first flexible printed circuit board 400 may also contact with each other.

In addition, although in the above embodiments, the first panel joining region 102 and the second panel joining region 202 are located on the same side with respect to the common driving component, in another example, the first panel joining region 102 and the second panel joining region 202 may be arranged on two opposed sides with respect to the common driving component. That is, in the embodiments of the present disclosure, the positions of the first panel joining region 102 and the second panel joining region 202 with respect to the common driving component are not intended to be limited as long as the first flexible printed circuit board 400 is expanded or folded to receive in the first display module 10 when the first display module 10 and the second display module 20 are in different states.

Further, the first display module 10 and the second display module 20 may both be flexible display modules. For example, the first display panel 100 and the second display panel 200 are both organic light emitting display devices. In this way, when the first display module 10 and the second display module 20 are displaced with each other by a certain distance (for example, the maximum distance), the double display device may be used as a wearable apparatus, for example a smart bracelet. When the first display module 10 and the second display module 20 are displaced with each other by the minimum distance (for example, the first display module 10 and the second display module 20 are in combination aligned with each other), the double display device may for example be used as communication terminals such as cell phones. For example, the first display module 10 and the second display module 20 may be curve display modules, thereby they may form a ring or semi-ring structure when they are displaced with each other.

It should be understood that in the double display device provided by some of the embodiments of the present disclosure, the common driving component may be configured to only drive source electrodes of the first display panel and the second display panel and gate electrodes of the first display panel may be driven for example by other driving components. In this way, the common driving component may use a same driving chip to output the first and second driving signals to drive the source electrodes of the first and second display panels. Similarly, in the double display device provided by some other embodiments of the present disclosure, the common driving component may be configured to only drive gate electrodes of the first display panel and the second display panel. The source electrodes of the first display panel may be driven for example by other driving components. In this way, the common driving component may use the same driving chip to output the first and second driving signals to drive the gate electrodes of the first and second display panels respectively. Thus, the number of the used driving chips may be further reduced without increasing the complexity of the driving chips, so as to further reduce the manufacturing cost.

Figure 5:
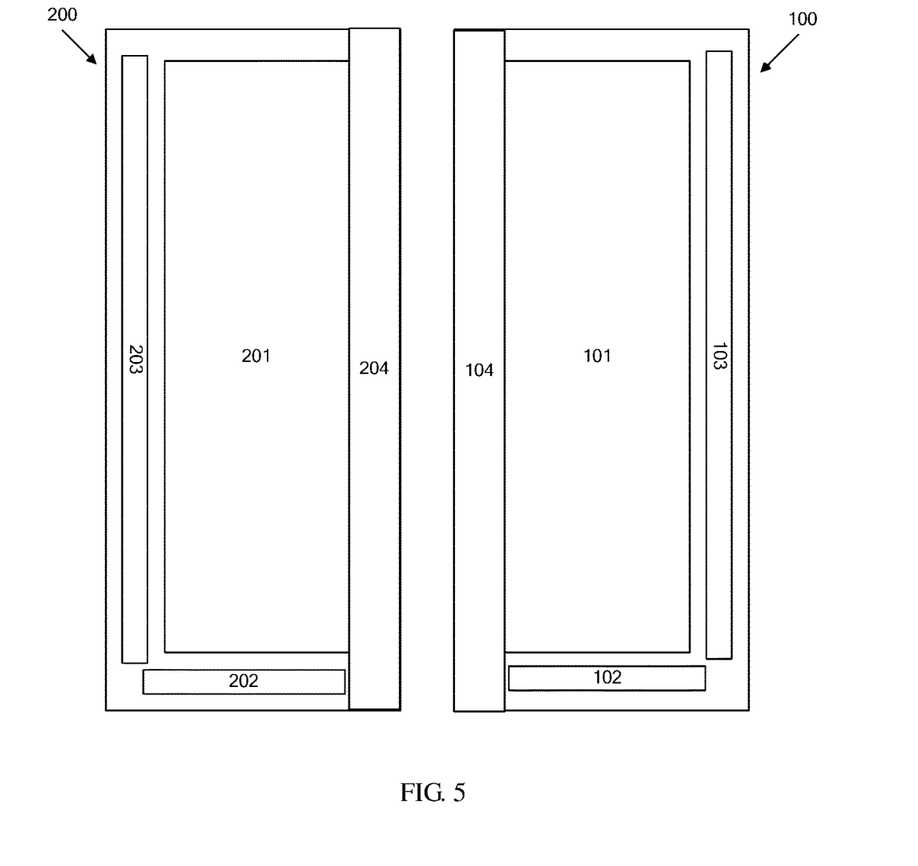
FIG. 5 is a schematic top view showing a structure of the first display panel and the second display panel in the double display apparatus according to an embodiment of the present disclosure.

FIG. 5 is a schematic top view showing a structure of the first display panel and the second display panel of the double display device according to an embodiment of the present disclosure.

With reference to FIG. 5, for example, the first display panel 100 further includes a first gate driver on array substrate arranged on one side of the first display panel 100 besides it includes the first display region 101 and the first panel joining region 102. Here, the gate driver on array substrate means units using GOA (Gate Driver on Array) technology. Such technology produces the gate driver ICs on the array substrate directly in place of the driving chips produced by external connection silicon chips. Below, the term "gate driver on array substrate" is abbreviated as "GOA unit". The first GOA unit 103 and the first panel joining region 102 are located a peripheral region out of the first display region 101. The second display panel 200 further includes the second GOA unit 203 arranged on a side of the second display panel 200, besides the second display region 201 and the second panel joining region 202. The second GOA unit 203 and the second panel joining region 202 are located in a peripheral region out of the second display region 201.

In the embodiment, the first GOA unit 103 is arranged on the side of the first display panel 100 facing away from the second display panel 200 and the second GOA unit 203 is arranged on the side of the second display panel 200 facing away from the first display panel 100. In this way, it may facilitate seamless connection between the first display region 101 of the first display panel 100 and the second display region 201 of the second display panel 200.

In the embodiment shown in FIG. 5, the first driving signal provided by the common driving component of the double display device is only provided to data lines of the first display panel for driving source electrodes and the second driving signal provided by the common driving component of the double display device is only provided to data lines of the second display panel for driving source electrodes. The gate electrodes of the first display panel may be driven by the first GOA unit and the gate electrodes of the second display panel may be driven by the second GOA unit.

Figure 6A:
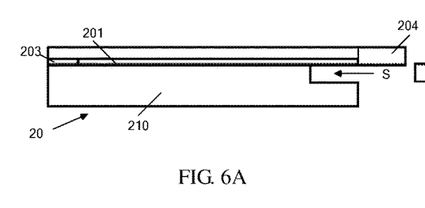
FIG. 6A and FIG. 6B are schematic cross-sectional views showing the first display module and the second display module of the double display device according to an embodiment of the present disclosure.
Figure 6B:
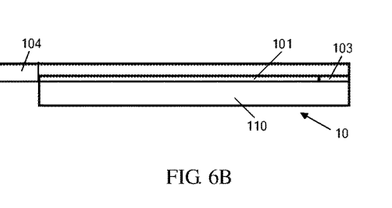
Figure 6C:
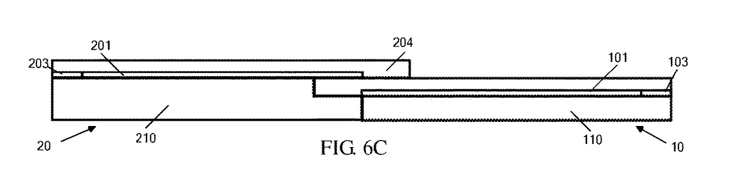
FIG. 6C is a schematic cross-sectional view showing a connecting state of the first display module shown in FIG. 6A with the second display module shown in FIG. 6B.

FIG. 6A and FIG. 6B show schematic cross sectional views of the first display module and the second display module of the double display device provided by an embodiment of the present disclosure. FIG. 6C is a schematic cross sectional view showing a connection state of the first display module and the second display module shown in FIG. 6A and FIG. 6B. In FIGS. 6A-6C, for the sake of brevity, structures outside the first GOA unit 103 and the second GOA unit 203 of the double display device are not shown.

With reference to FIG. 5 and FIGS. 6A-6B, the first display panel 100 and the second display panel 200 are for example arranged in different layers respectively. In an example, see FIG. 5 again, the first display panel 100 for example includes a first packaging portion 104 on its side adjacent to the second display panel 200 and the second display panel 200 for example includes a second packaging portion 204 on its side adjacent to the first display panel 100. Here, the first display panel 100 and the second display panel 200 both are for example organic light emitting display (abbreviated as OLED) panels, each of which includes an array substrate and a packaging layer attached to the array substrate. The packing layer is made from for example transparent organic material. For example, the first packaging portion 104 and the second packaging portion 204 are part of the packaging layer.

In FIGS. 6A to 6C, the upper side of each of the first display module 10 and the second display module 20 is a display side. The first display module 10 has a first support structure 110 for supporting the first display panel 100, for example, the first support structure 110 includes a first module cover. The second display module 20 has a second support structure 210 for supporting the second display panel 100, for example, the second support structure 210 includes a second module cover. The second display module 20 for example includes a groove S for receiving the first packaging portion on a side opposite to the display side of the second display panel 200. The first packaging portion 104 is configured to able to slide within the groove S, as illustrated in FIG. 6C. By the sliding member composed of the first packaging portion 104 formed on the first display module 10 and the groove S formed on the second display module 20, the first display module 10 and the second display module 20 are connected slidably with each other. In the embodiment shown in FIGS. 6A-6C, the first packaging portion 104 of the first display panel 100 is arranged below the second display region 201 of the second display panel and the second packaging portion 204 of the second display panel 200 is arranged above the first display region 101 of the first display panel, so as to achieve seamless connection between the first display region 101 and the second display region 201.

Figure 7A:
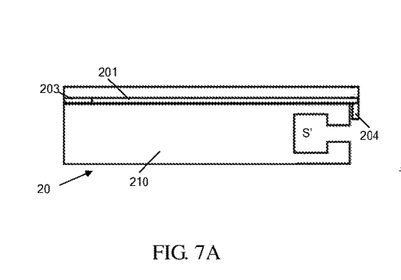
FIG. 7A and FIG. 7B are schematic cross-sectional views showing the first display module and the second display module of the double display device according to another embodiment of the present disclosure.
Figure 7B:
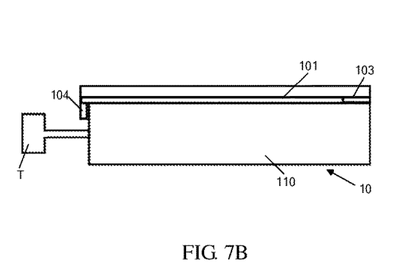
Figure 7C:
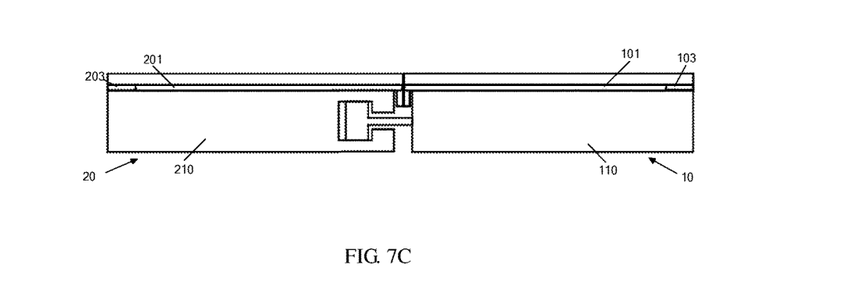
FIG. 7C is a schematic cross-sectional view showing a connecting state of the first display module shown in FIG. 7A with the second display module shown in FIG. 7B.

FIG. 7A and FIG. 7B show schematic cross sectional views of the first display module and the second display module of the double display device provided by another embodiment of the present disclosure. FIG. 7C is a schematic cross sectional view showing a connection state of the first display module and the second display module shown in FIG. 7A and FIG. 7B. In FIGS. 7A-7C, for the sake of brevity, structures outside the first GOA unit 103 and the second GOA unit 203 of the double display device are not shown.

With reference to FIGS. 7A to 7C, the first display panel 100 and the second display panel 200 are for example in essential arranged in the same layer. In FIGS. 7A to 7C, the upper side of each of the first display module 10 and the second display module 20 is a display side. In an example, see FIG. 7A, one end of the first packaging portion 104 of the first display panel 100 shown in FIG. 5 bends downwardly and extends downwardly from an opposite side in opposite to the display side of the first display panel 100. See FIG. 7B, one end of the second packaging portion 204 of the second display panel 200 shown in FIG. 5 bends downwardly and extends downwardly from an opposite side in opposite to the display side of the second display panel 200. The second display module 20 is for example formed with a groove S' on an opposite side in opposite to the display side of the second display panel 200 (i.e., one end of the second support structure 210 adjacent to the first display module). The first display module 10 is for example formed with a protruded slider T on the opposite side in opposite to the display side of the first display panel 100 (i.e., one end of the first support structure 110 adjacent to the second display module). The slider T is configured to able to slide in the groove S', as illustrated in FIG. 7C. By the sliding member composed of the slider T formed on the first display module 10 and the groove S' formed on the second display module 20, the first display module 10 and the second display module 20 are connected slidably with each other. In the embodiment shown in FIGS. 7A-7C, on one hand, seamless connection between the first display region 101 and the second display region 201 is achieved, on the other hand, the first display panel 100 and the second display panel 200 are in essential arranged in the same layer, so as to provide improved display effects.

Further, although the first display module 10 and the second display module 20 in the above embodiments are connected slidably with each other by the sliding structure including the recess member and protruded member, the embodiments of the present disclosure are not limited to this. In another embodiment, the first display module 10 and the second display module 20 may for example be connected slidably with each other by a sliding connection mechanism provided separately between the first display module 10 and the second display module 20. The sliding connection mechanism for example includes a first strip protrusion arranged on an opposite side in opposite to the display side of the first display module, a second strip protrusion arranged on an opposite side in opposite to the display side of the second display module and a connection track embedded with the first strip protrusion and the second strip protrusion. The first strip protrusion and the second strip protrusion slide in the connection track.

In another embodiment of the present disclosure, the sliding structure may also include assistant structure such as springs to help the user to perform a sliding operation.

An embodiment of the present disclosure also provides a wearable apparatus including the double display device described as above, for example, a smart bracelet.

Although several exemplary embodiments have been described, it would be appreciated by those skilled in the art that the above embodiments may be modified or varied. Various modifications or variations made in these embodiments without departing from the principles and spirit of the disclosure will also fall within the scope of the present disclosure.

What is claimed is:

1. A double display device, comprising:
a first display module and a second display module arranged in parallel and connected slidably with each other, the first display module comprising a first display panel, and the second display module comprising a second display panel; and
a common driving component configured to provide a first driving signal to the first display panel and provide a second driving signal to the second display panel,
wherein the first display module comprises a first display surface and a first side surface perpendicular to the first display surface, and the second display module comprises a second display surface and a second side surface perpendicular to the second display surface, the first display surface is parallel to the second display surface, the first side surface and the second side surface are disposed adjacent to each other in parallel and arranged face to face, and the first display module and the second display module are configured to be slidable with respect to each other in a direction where the first side surface and the second side surface extend parallel to the first display surface and the second display surface.

2. The double display device according to claim 1, wherein the common driving component is arranged to move along with the second display module with respect to the first display panel.

3. The double display device according to claim 1, wherein the common driving component comprises a printed circuit board and at least one driving chip mounted on the printed circuit board, the at least one driving chip outputting at least the first driving signal and the second driving signal.

4. The double display device according to claim 1, further comprising a first flexible printed circuit board which has one end connected to the common driving component and the other end connected to the first display panel, to transmit the first driving signal.

5. The double display device according to claim 4, further comprising a second flexible printed circuit board which has one end connected to the common driving component and the other end connected to the second display panel, to transmit the second driving signal.

6. The double display device according to claim 5, wherein the common driving component comprises a first joining region coinciding with the first display module and a second joining region coinciding with the second display module, and wherein the first display panel has a first panel joining region and the second display panel has a second panel joining region, the first flexible printed circuit board is electrically connected to the common driving component by the first joining region and to the first display panel by the first panel joining region, and the second flexible printed circuit board is electrically connected to the common driving component by the second joining region and to the second display panel by the second panel joining region.

7. The double display device according to claim 6, wherein the common driving component comprises a printed circuit board and a first driving chip mounted on the printed circuit board, the first driving chip outputting the first driving signal and the second driving signal.

8. The double display device according to claim 6, wherein the common driving component comprises a printed circuit board and first and second driving chips mounted on the printed circuit board, the first driving chip outputting the first driving signal and the second driving chip outputting the second driving signal.

9. The double display device according to claim 4, further comprising a guiding member fixed to the first display module, wherein the first flexible printed circuit board bends around at least a part of the guiding member at least in a state that the first display module and the second display module are displaced with each other by a minimum distance.

10. The double display device according to claim 9, wherein the first flexible printed circuit board is in an extending state, without bending, in entirety at least in the case that the first display module and the second display module are displaced with each other by a maximum distance.

11. The double display device according to claim 1, wherein the first display module and the second display module are both flexible display modules.

12. The double display device according to claim 11, wherein the first display panel comprises a first gate driver on array substrate formed on a side of the first display panel facing away from the second display panel and the second display panel comprises a second gate driver on array substrate formed on a side of the second display panel facing away from the first display panel.

13. The double display device according to claim 12, wherein the first driving signal provided by the common driving component is configured to drive a source electrode of the first display panel and the second driving signal provided by the common driving component is configured to drive a source electrode of the second display panel.

14. The double display device according to claim 6, wherein the first panel joining region and the second panel joining region are located on a same side of the common driving component.

15. The double display device according to claim 1, wherein the first display panel and the second display panel are arranged in different layers respectively, and wherein the first display panel has a first packaging portion coinciding with the second display region of the second display panel, on a side of the first display panel facing towards the second display panel and the second display panel has a second packaging portion coinciding with the first display region of the first display panel, on a side of the second display panel facing towards the first display panel, and the second display module has a groove for receiving the first packaging portion on an opposite side in opposite to a display side of the second display panel, the first packaging portion being configured to be slidable within the groove.

16. The double display device according to claim 1, wherein the first display panel and the second display panel are arranged substantially in a same layer, and wherein the first display panel has a first packaging portion on a side of the first display panel facing towards the second display panel and the second display panel has a second packaging portion on a side of the second display panel facing towards the first display panel, and an end of the first packaging portion bends and extends downwardly from an opposite side in opposite to the display side of the first display panel and an end of the second packaging portion bends and extends downwardly from an opposite side in opposite to the display side of the second display panel.

17. The double display device according to claim 1, wherein the first display module and the second display module are connected slidably with each other by a sliding connection mechanism.

18. The double display device according to claim 17, wherein the sliding connection mechanism comprises a protruded member arranged on one of the first display module and the second display module and a sliding chute arranged on the other of the first display module and the second display module and configured to receive at least one part of the protruded member, the protruded member being configured to slide in the sliding chute.

19. The double display device according to claim 17, wherein the sliding connection mechanism comprises a first strip protrusion arranged on an opposite side in opposite to the display side of the first display module, a second strip protrusion arranged on an opposite side in opposite to the display side of the second display module and a connection track embedded with the first strip protrusion and the second strip protrusion, the first strip protrusion and the second strip protrusion sliding in the connection track.

20. A wearable apparatus comprising the double display device according to claim 1.

* * * * *